US012699362B2

(12) United States Patent (10) Patent No.: US 12,699,362 B2
Osagawa (45) Date of Patent: Aug. 4, 2026

(54) PRODUCTION LINE CONTROL DEVICE, PRODUCTION LINE CONTROL METHOD, AND PRODUCTION LINE CONTROL SYSTEM

(71) Applicant: Mitsubishi Electric Corporation, Tokyo (JP)

(72) Inventor: Daisuke Osagawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 344 days.

(21) Appl. No.: 18/218,153

(22) Filed: Jul. 5, 2023

(65) Prior Publication Data

US 2023/0341823 A1 Oct. 26, 2023

Related U.S. Application Data

(63) Continuation of application No. PCT/JP2021/007699, filed on Mar. 1, 2021.

(51) Int. Cl.
G05B 13/02 (2006.01)
(52) U.S. Cl.
CPC ................................. G05B 13/0265 (2013.01)
(58) Field of Classification Search
CPC ... G05B 13/0265; G05B 19/418; G06Q 50/04
(Continued)

(56) References Cited

U.S. PATENT DOCUMENTS

2003/0195794 A1 10/2003 Yasuda
2019/0147655 A1* 5/2019 Galera ..................... G06T 15/20
345/419
2022/0040932 A1* 2/2022 Gaede ..................... B29C 48/12

FOREIGN PATENT DOCUMENTS

CN 202237943 U 5/2012
CN 106022620 A * 10/2016 ......... G06Q 10/0631
(Continued)

OTHER PUBLICATIONS

German Office Action for German Application No. 11 2021 006 704.4, dated Jun. 5, 2024, with an English translation.
(Continued)

*Primary Examiner* — Paul B Yanchus, III
*Assistant Examiner* — Michael Tang
(74) *Attorney, Agent, or Firm* — Birch, Stewart, Kolasch & Birch, LLP

(57) ABSTRACT

A production line control device includes: an input unit to receive user identification information and product identification information; an authentication unit to authenticate the user identification information; an acquisition unit to acquire a production condition for producing a product associated with the product identification information and the user identification information; a modification unit to generate a modified production condition by modifying the production condition acquired by the acquisition unit; a supply instruction unit to instruct a material supply device corresponding to the modified production condition to supply a material corresponding to the modified production condition; a processing instruction unit to instruct a processing device corresponding to the modified production condition to process a material corresponding to the modified production condition; and a storage instruction unit to instruct a product storage device corresponding to the modified production condition to store a product.

10 Claims, 7 Drawing Sheets

| User identification information RS | Product identification information SS | Production conditions | | |
|---|---|---|---|---|
| | | Material supply condition J1 | Processing condition J2 | Storage condition J3 |
| U I D 0 1 | SID01 (Bread) | Device ID : ZK01 Amount : 1 (KG) Authentication information : KC11 | Device ID : KK01 Processing time : 10 (M)<br>Device ID : KK02 Processing time : 20 (M)<br>Device ID : KK03 Processing time : 10 (M) | Device ID : KN01 Authentication information : KC12 |
| U I D 0 2 | SID01 (Bread) | Device ID : ZK02 Amount : 1 (KG) Authentication information : KC21 | Device ID : KK01 Processing time : 20 (M)<br>Device ID : KK02 Processing time : 10 (M)<br>Device ID : KK03 Processing time : 10 (M) | Device ID : KN02 Authentication information : KC22 |

152

(58) Field of Classification Search
USPC .......................................................... 700/83
See application file for complete search history.

(56)                    References Cited

FOREIGN PATENT DOCUMENTS

| | | | | | |
|----|------------|---|---|---------|---------------|
| CN | 110726433  | A | * | 1/2020  | ............. G01D 21/02 |
| CN | 111738806  | A | * | 10/2020 | ......... G06Q 30/0641 |
| CN | 111857065  | A |   | 10/2020 | |
| CN | 111966021  | A | * | 11/2020 | ......... G05B 19/0428 |
| CN | 112068507  | A | * | 12/2020 | ....... G05B 19/41875 |
| JP | 2002-324179 | A |   | 11/2002 | |
| JP | 2003-308366 | A |   | 10/2003 | |
| JP | 2007-241954 | A |   | 9/2007  | |
| JP | 2014021755 | A | * | 2/2014  | |
| JP | 2017-111625 | A |   | 6/2017  | |
| JP | 2020-149714 | A |   | 9/2020  | |

OTHER PUBLICATIONS

International Search Report (PCT/ISA/210) issued in PCT/JP2021/007699 mailed on May 11, 2021.
Japanese Notification of Reason for Refusal dated Jan. 18, 2022 in Japanese Patent Application No. 2021-555194.
Chinese Office Action and Search Report for Chinese Application No. 202180094485.3, dated Nov. 5, 2025, with English translation.
Chinese Office Action and Search Report for Chinese Application No. 202180094485.3, dated May 29, 2026, with English translation of the Office Action.

* cited by examiner

Fig. 3

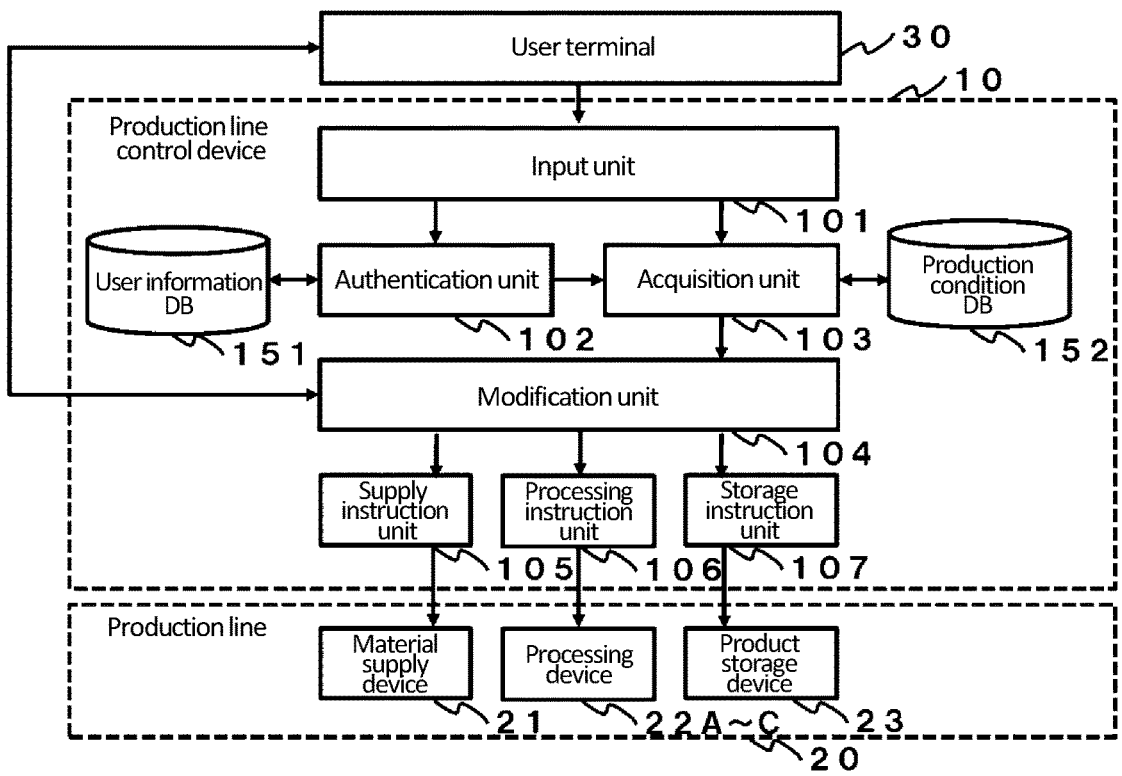

Fig. 4

| User identification information RS | Product identification information SS | Production conditions | | |
|---|---|---|---|---|
| | | Material supply condition J1 | Processing condition J2 | Storage condition J3 |
| U I D 0 1 | SID01 (Bread) | Device ID : ZK01 Amount : 1 (KG) Authentication information : KC11 | Device ID : KK01 Processing time : 10 (M)  Device ID : KK02 Processing time : 20 (M)  Device ID : KK03 Processing time : 10 (M) | Device ID : KN01 Authentication information : KC12 |
| U I D 0 2 | SID01 (Bread) | Device ID : ZK02 Amount : 1 (KG) Authentication information : KC21 | Device ID : KK01 Processing time : 20 (M)  Device ID : KK02 Processing time : 10 (M)  Device ID : KK03 Processing time : 10 (M) | Device ID : KN02 Authentication information : KC22 |

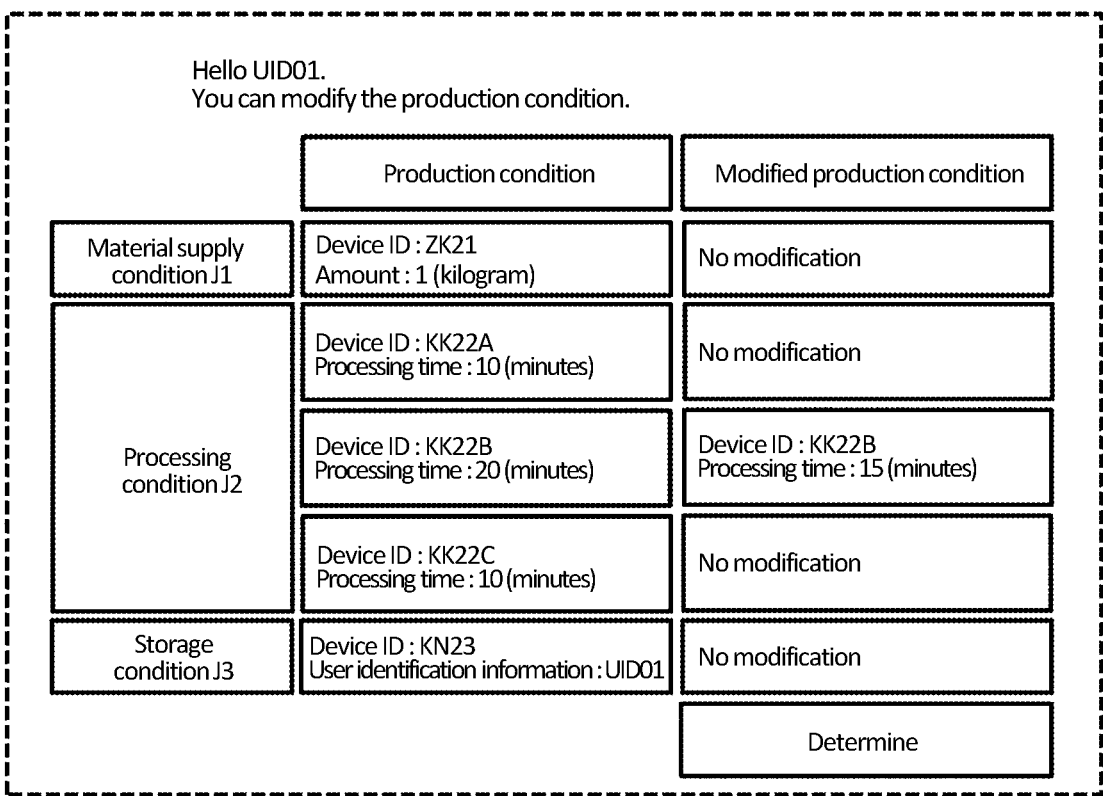

Hello UID01.
You can modify the production condition.

|  | Production condition | Modified production condition |
|---|---|---|
| Material supply condition J1 | Device ID : ZK21<br>Amount : 1 (kilogram) | No modification |
| Processing condition J2 | Device ID : KK22A<br>Processing time : 10 (minutes) | No modification |
|  | Device ID : KK22B<br>Processing time : 20 (minutes) | Device ID : KK22B<br>Processing time : 15 (minutes) |
|  | Device ID : KK22C<br>Processing time : 10 (minutes) | No modification |
| Storage condition J3 | Device ID : KN23<br>User identification information : UID01 | No modification |
|  |  | Determine |

Fig. 6

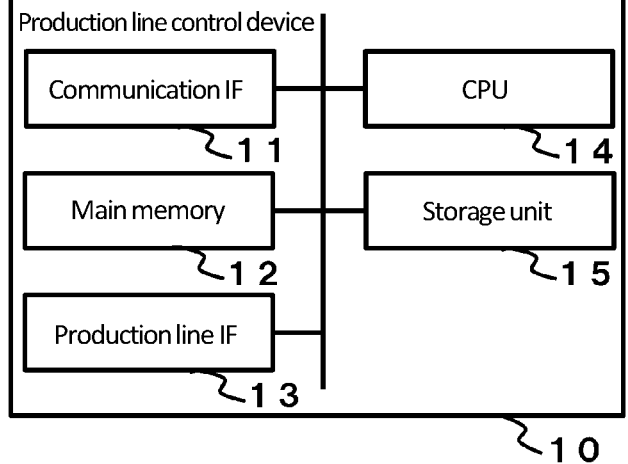

Production line control device

Communication IF   1 1

Main memory   1 2

Production line IF   1 3

CPU   1 4

Storage unit   1 5

1 0

PRODUCTION LINE CONTROL DEVICE, PRODUCTION LINE CONTROL METHOD, AND PRODUCTION LINE CONTROL SYSTEM

CROSS REFERENCE TO RELATED APPLICATIONS

This application is a Continuation of PCT International Application No. PCT/JP2021/007699 filed on Mar. 1, 2021, which is hereby expressly incorporated by reference into the present application.

TECHNICAL FIELD

This invention relates to a production line control device, a production line control method, and a production line control system.

BACKGROUND ART

For example, Document 1 discloses a technique in which a production line for producing products from materials is shared by a plurality of users. Document 1 also discloses a technique in which a user sets a production condition for producing a product each time the user requests to produce the product.

PRIOR ART DOCUMENT

Patent Document

Patent Document 1: Japanese Unexamined Patent Publication No. 2002-324179

SUMMARY OF INVENTION

Problems to be Solved by Invention

In a case where the production line is shared by the plurality of users as in the technique disclosed in Document 1, there is a risk that trade secrets for producing products are leaked to unauthorized third parties. In addition, a user may feel inconvenience of setting production a condition each time the user requests to produce the product.

The present invention has been made to solve the above-described problems, and an object thereof is to reduce the risk of leakage of trade secrets for producing products and inconvenience of setting a production condition, even when a production line for producing products is shared by a plurality of users.

Means for Solving Problems

A production line control device according to the present disclosure is to control a production line shared by a plurality of users and having a material supply device that supplies a stored material, a processing device that processes the material supplied from the material supply device, and a product storage device that stores a product processed by the processing device; the production line control device includes: an input unit to receive user identification information of the plurality of users and product identification information indicating a product to be produced in the production line from each of a plurality of user terminals connected via a network; an authentication unit to authenticate the user identification information received by the input unit; an acquisition unit to acquire a production condition for producing a product associated with the product identification information received by the input unit and the user identification information authenticated by the authentication unit; a modification unit to generate a modified production condition by modifying the production condition acquired by the acquisition unit; a supply instruction unit to instruct a material supply device corresponding to the modified production condition generated by the modification unit to supply a material corresponding to the modified production condition; a processing instruction unit to instruct a processing device corresponding to the modified production condition generated by the modification unit to process a material corresponding to the modified production condition; and a storage instruction unit to instruct a product storage device corresponding to the modified production condition generated by the modification unit to store a product.

Effects of Invention

The present invention has effects of reducing the risk of leakage of trade secrets for producing products and inconvenience of setting a production condition, even when a production line for producing products is shared by a plurality of users.

BRIEF DESCRIPTION OF DRAWINGS

FIG. 3 is a functional block diagram of a production line control device 10.

FIG. 4 is a diagram showing an example of a production condition DB 152.

FIG. 5 is a screen for accepting a modification to a production condition.

FIG. 6 is a hardware configuration diagram of the production line control device 10.

MODE FOR CARRYING OUT INVENTION

1. Embodiment 1

Figure 1:
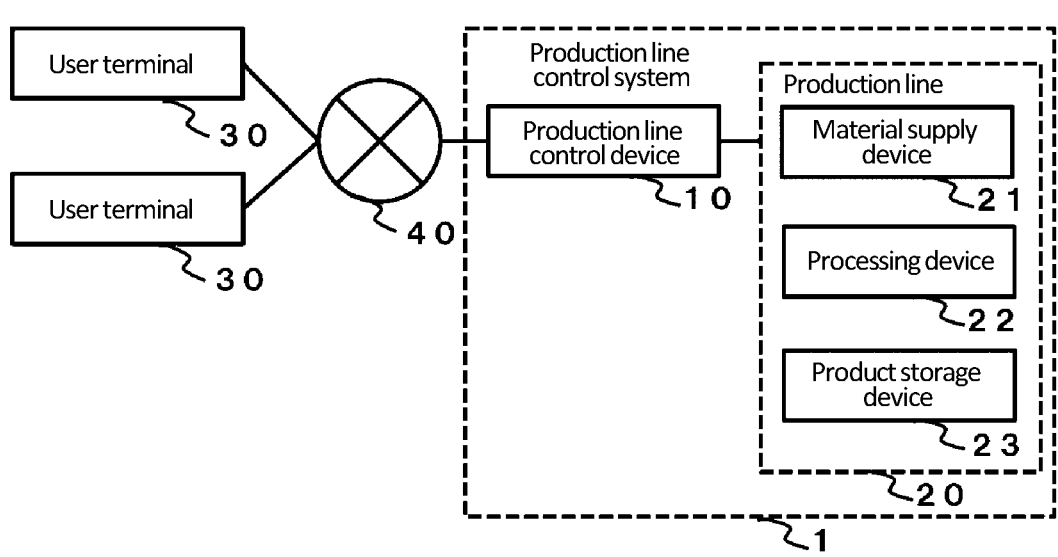
FIG. 1 is a configuration diagram of a production line control system 1.

A configuration example of a production line control system 1 according to the present embodiment will be described. FIG. 1 is a schematic diagram showing a configuration example of the production line control system 1 according to the present embodiment. The production line control system 1 includes a production line 20 shared by a plurality of users, and a production line control device 10 that controls devices constituting the production line 20. The production line control device 10 accepts, from a user terminal 30 connected via a network 40, production request information, with which the production of a product is requested. The production line control device 10 also outputs to each device constituting the production line 20, control information for producing a product corresponding to the production request information in the production line 20, Each device constituting the production line 20 performs processing in accordance with the received control information. In the present embodiment, the production line 20 is applied to the field of process automation in the food industry to produce "bread". However, the product produced by the production line 20 is not limited to bread (food), but may be any product produced by material processing. In addition, the application field of the production line 20 is not limited to the food industry, but may be a field of process automation such as chemical industry. The production line control system 1 may include more than one production lines 20.

Figure 2:
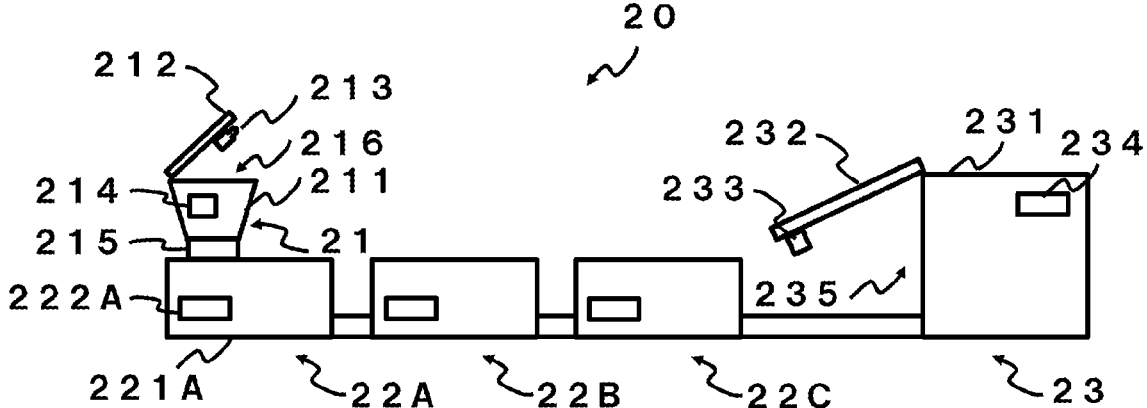
FIG. 2 is a side view showing a schematic configuration of a production line 20.

FIG. 2 is a side view showing a schematic configuration of the production line 20. The production line 20 includes a material supply device 21 that supplies materials, processing devices 22A to 22C that process the material supplied from the material supply device 21, and a product storage device 23 that stores the product processed by the processing devices 22A to 22C. Note that, in the following description, when it is not necessary to distinguish between the processing devices 22A to 22C, the alphabetical character at the end is omitted. Although the material supply device 21 is provided only in the processing device 22A, another one may be provided in the processing devices 22B and 22C.

The material supply device 21 includes a housing 211, an opening/closing cover 212, a lock mechanism 213, an operation unit 214, and a material supply mechanism 215. The housing 211 stores a material for producing a product. In the present embodiment, the housing 211 stores flour for producing bread. The material supply mechanism 215 supplies the material to the processing device 22 in an amount according to the control information outputted from the production line control device 10. The material supply mechanism 215 supplies the material to the processing device 22 using well-known techniques, such as opening and closing a valve, and rotating an auger, for example. Here, the materials used to produce the product may contain information, e.g., trade secrets, that needs to be protected from spillage or leakage to unauthorized third parties. Sharing the production line 20 creates the risk of spillage or leakage of the material stored in the material supply device 21 by the unauthorized third parties, Therefore, the material supply device 21 has a function of reducing the risk of spillage or leakage of information about the material to the unauthorized third parties. Specifically, the material supply device 21 includes the lock mechanism 213 that locks, at a closed position, the opening/closing cover 212, which is provided so as to be movable to the closed position, where it closes an opening 216 provided in the housing 211, or to the open position, where it does not close the opening 216. The lock mechanism 213 locks the opening/closing cover 212 at the closed position by using the authentication information inputted from the operation unit 214 provided in the housing 211 or from the production line control device 10. This allows the material supply device 21 to reduce the risk of spillage or leakage of information about the material to the unauthorized third parties. Also, the lock mechanism 213 executes unlocking by using the authentication information inputted from the operation unit 214 provided in the housing 211 or from the production line control device 10. This allows an authorized user or material delivery company personnel to move the opening/closing cover 212 to the open position and then bring in material through the opening 216 of the housing 211.

The processing device 22 has a function of processing the material supplied from the material supply device 21 in accordance with the control information outputted from the production line control device 10. In the present embodiment, the processing device 22A is a stirrer, and stirs the material (flour) supplied from the material supply device 21 for a time corresponding to the control information outputted from the production line control device 10. The processing device 22A thereby processes the flour into bread dough. In the present embodiment, the processing device 22B is a fermenter, and ferments the dough processed in the processing device 22A for a time corresponding to the control information outputted from the production line control device 10. The processing device 22B thereby processes the dough into a fermented dough. In the present embodiment, the processing device 22C is a heater, and heats the fermented dough processed in the processing device 22B for a time corresponding to the control information outputted from the production line control device 10. the processing device 22C thereby processes the fermented dough into bread. In addition to the functions of stirring, fermenting, and heating, the processing device 22 may have functions such as mixing, stretching, kneading, cutting, frying, molding, and humidity control, for example. In this case, the functions of the processing device 22 should also be controlled on the basis of the control information.

The product storage device 23 includes a housing 231, an opening/closing cover 232, a lock mechanism 233, and an operation unit 234. The housing 231 stores the product produced in the production line 20. Here, the product produced in the production line 20 may contain information, e.g., trade secrets, that needs to be protected from spillage or leakage to unauthorized third parties. Sharing the production line 20 creates the risk of spillage or leakage of the product produced in the production line 20 by the unauthorized third parties. Therefore, the product storage device 23 has a function of reducing the risk of spillage or leakage of information about the product to the unauthorized third parties. Specifically, the product storage device 23 includes the lock mechanism 233 that locks, at a closed position, the opening/closing cover 232, which is provided so as to be movable to the closed position, where it closes an opening 235 provided in the housing 231, or to the open position, where it does not close the opening 235. After the product processed by the processing device 22 is stored, the lock mechanism 233 executes locking by using authentication information inputted from the production line control device 10. This allows the product storage device 23 to reduce the risk of spillage or leakage of information about the product to the unauthorized third parties. Also, the lock mechanism 233 executes unlocking by using the authentication information inputted from the operation unit 234 provided in the housing 231 or from the production line control device 10. This allows an authorized user or personnel of a product carry-out company to move the opening/closing cover 232 to the open position and then take out the product through the opening 235 of the housing 231. The transfer of the product from the processing device 22 to the product storage device 23 can be realized by using well-known transfer techniques, such as robots, conveyors, and unmanned transport vehicles, for example.

FIG. 3 is a functional block diagram of the production line control device 10. The production line control device 10 includes an input unit 101, an authentication unit 102, an acquisition unit 103, a modification unit 104, a supply instruction unit 105, a processing instruction unit 106, and a storage instruction unit 107. The production request information transmitted from the user terminal 30 is inputted into the input unit 101. The production request information includes user identification information to identify the user requesting the production of the product, and product identification information to identify the product to be produced in the production line 20. In the present embodiment, it is assumed that the user sends from the user terminal 30 the production request information including "UID01" as his/her user identification information and "SID01" as the product identification information corresponding to the product (bread) to be requested for production. The authentication unit 102 authenticates the user by checking the user identification information inputted into the input unit 101 against the user identification information registered in a user identification information DB 151. The authentication method of the authentication unit 102 is not limited to this, and well-known methods of authentication, such as a combination of passwords and biometric information, may be used, for example. The acquisition unit 103 acquires, from a production condition DB 152, the product identification information inputted into the input unit 101 and a production condition for producing the product associated with the user identification information authenticated by the authentication unit 102. By employing such a configuration, a user is not authenticated by the authentication unit 102 unless the user knows the user identification information. Furthermore, a user cannot access the production condition for producing the product unless the user knows the combination of the product identification information and the user identification information. Therefore, employing such a configuration can reduce the risk of spillage or leakage of information about the product to the unauthorized third parties.

FIG. 4 is a diagram showing an example of the production condition DB 152. In the production condition DB 152, production conditions are registered in association with user identification information RS and product identification information SS. The production conditions include identification information for identifying the device to be controlled (device ID), control information for controlling the device (amount, processing time), and authentication information for unlocking the device.

In a material supply condition J1, which is a production condition for the material supply device 21, a device ID for identifying the material supply device 21 to be instructed to supply material, the amount of the material to be supplied, and authentication information for unlocking the lock mechanism 213, are registered. Here, the material supply condition is registered for instructing the material supply device 21 with the device ID "ZK01" to supply the material with an amount of "1 KG" and to set the authentication information "KC11".

In a processing condition J2, which is a production condition for the processing device 22, a device ID for identifying the processing device 22 to be instructed to process the material and the time to process the material (processing time) are registered. Here, a processing condition is registered to instruct the processing device 22 (stirrer) with a device ID "KK01" to perform processing (stirring)

for a processing time of "10 minutes". Also, a processing condition is registered to instruct the processing device 22 (fermenter) with a device ID "KK02" to perform processing (fermenting) for a processing time of "20 minutes". Also, a processing condition is registered to instruct the processing device 22 (heater) with a device ID "KK03" to perform processing (heating) for a processing time of "10 minutes". The processing condition J2 may include information for controlling the operation of the functions of the processing device 22, such as temperature, humidity, force, speed, and/or processing time.

In a storage condition J3, which is a production condition for the product storage device 23, a device ID for identifying the product storage device 23 to be instructed to store the product and authentication information for unlocking the lock mechanism 233 are registered. Here, the storage condition is registered for instructing the product storage device 23 with the device ID "KN01" to store the product and to set the authentication information "KC12".

Here, the description returns to that of FIG. 3. The modification unit 104 generates a modified production condition by modifying the production condition acquired by the acquisition unit 103. In the present embodiment, as shown in FIG. 5, the modification unit 104 accepts modification to the production condition displayed on a display screen of the user terminal 30, thereby generating the modified production condition obtained by modifying the production condition acquired by the acquisition unit 103. This eliminates the need for a user to input a production condition each time the user makes a production request. In addition, for example, even in a case where a user has production know-how to change the dough fermentation time in accordance with the humidity and the air temperature on the production day, it is not necessary to modify the production condition registered in the production condition DB 152 in accordance with the humidity and the air temperature on the production day. Thus, this reduces the inconvenience of inputting a production condition and modifying the production condition DB 152 each time a production request is made. Furthermore, because the information registered in the production condition DB 152 does not include production know-how, the risk of leakage of trade secrets can be reduced compared to the case where production know-how is included in the information registered in the production condition DB 152.

The supply instruction unit 105 instructs the material supply device 21 corresponding to the modified production condition generated by the modification unit 104 to supply a material corresponding to the modified production condition. In the present embodiment, as shown in FIG. 5, the supply instruction unit 105 instructs the material supply device 21 with a device ID "ZK21" to supply the material (flour) with an amount of "1 (kilogram)".

The processing instruction unit 106 instructs the processing device 22 corresponding to the modified production condition generated by the modification unit 104 to process the material corresponding to the modified production condition. In the present embodiment, for example, as shown in FIG. 5, the processing instruction unit 106 instructs the processing device 22A having a stirring function and a device ID "KK22A" to perform processing (stirring) for a processing time of "10 (minutes)". The processing instruction unit 106 also instructs the processing device 22B having a device ID "KK22B" and a fermentation function to perform processing (fermenting) for a processing time of "15 (minutes)". The processing instruction unit 106 also instructs the processing device 22B having a device ID "KK22C" and a heating function to perform processing (heating) for a processing time of "10 (minutes)".

The storage instruction unit 107 instructs the product storage device 23 corresponding to the modified production condition generated by the modification unit 104 to store the product. In the present embodiment, for example, as shown in FIG. 5, the storage instruction unit 107 instructs the product storage device 23 with the device ID "KN23" to store the product (bread). The storage instruction unit 107 may also instruct the lock mechanism 233 of the product storage device 23 storing the product to execute locking. At this time, the storage instruction unit 107 gives an instruction to set user identification information "UIDO1" for the lock mechanism 233 to execute unlocking.

FIG. 6 is a hardware configuration diagram of the production line control device 10. The production line control device 10 includes a communication IF 11, a main memory 12, a production line IF 13, a CPU 14, and a storage unit 15. The main memory 12 is, for example, a nonvolatile memory that stores various programs to be executed by the CPU 14. The storage unit 15 stores programs to be executed by the CPU 14 and data to be used thereby. The CPU 14 performs each of the functions shown in FIG. 3 by executing programs etc. stored in the main memory 12. The communication IF 11 is connected to the user terminal 30 via the network 40. The production request information transmitted from the user terminal 30 is inputted to the communication IF 11. The production line IF 13 is connected to each device including the production line 20 and outputs control information to control each device including the production line 20.

Figure 7:
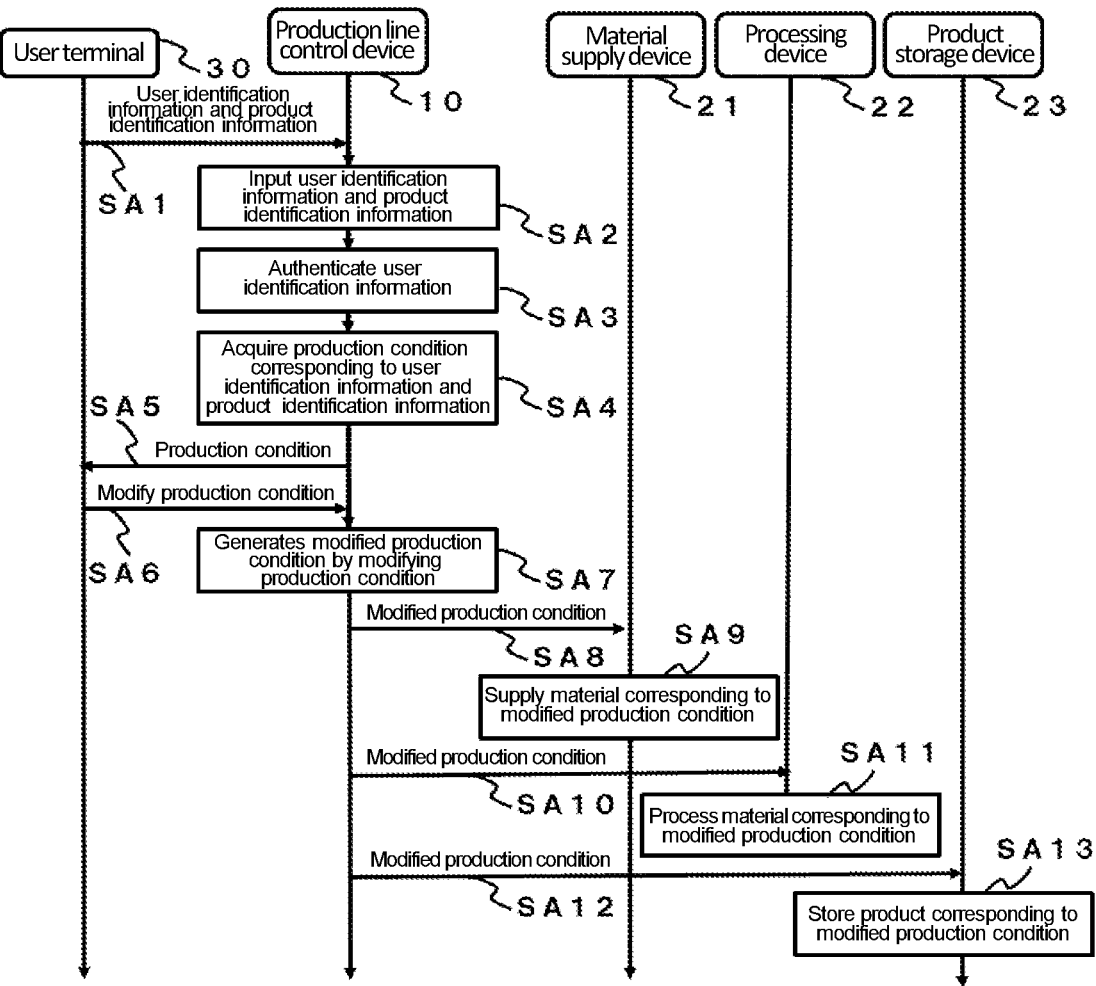
FIG. 7 is a flowchart relating to processing of the production line control system 1.

FIG. 7 shows a flowchart of the processing of the production line control system 1. The user operates the user terminal 30 to input his/her user identification information and product identification information indicating the product to be produced in the production line 20. The user terminal 30 transmits the production request information including the user identification information and the product identification information to the production line control device 10 (step SA1). The input unit 101 of the production line control device 10 accepts the input of the production request information transmitted from the user terminal 30 (step SA2). The authentication unit 102 of the production line control device 10 authenticates the user identification information inputted into the input unit 101 by using the user identification information registered in the user identification information DB 151 (step SA3). The acquisition unit 103 of the production line control device 10 acquires from the production condition DB 152 the production condition for producing the product associated with the product identification information inputted into the input unit 101 and the user identification information authenticated by the authentication unit 102 (step SA4). The modification unit 104 of the production line control device 10 transmits the production condition acquired by the acquisition unit 103 to the user terminal 30 (step SA5) and accepts modification to the transmitted production condition (step SA6). Then, the modification unit 104 of the production line control device 10 modifies the production condition acquired by the acquisition unit 103 to generate a modified production condition (step SA7). The supply instruction unit 105 of the production line control device 10 instructs the material supply device 21 corresponding to the modification unit 104 to supply material. Here, before instructing the material supply, the supply instruction unit 105 of the production line control device 10 may instruct the lock mechanism 213 to execute unlocking by using the user identification information authenticated by the authentication unit 102 (step SA8). The material supply device 21 supplies the material corresponding to the modified production condition to the processing device 22 in accordance with the material supply instruction (step SA9). Next, the processing instruction unit 106 of the production line control device 10 instructs the processing device 22 corresponding to the modified production condition generated by the modification unit 104 to process the material (step SA10). The processing device 22 processes the material corresponding to the modified production condition in accordance with the instruction of step SA10 (step SA11). Next, the storage instruction unit 107 of the production line control device 10 instructs the product storage device 23 corresponding to the modified production condition generated by the modification unit 104 to store the product. Here, the storage instruction unit 107 of the production line control device 10 may instruct, by using the user identification information authenticated by the authentication unit 102, the lock mechanism 233 of the product storage device 23 storing the product to execute locking (step SA12). The product storage device 23 stores the product in accordance with the instruction of step SA12 (step SA13).

In the present embodiment, the acquisition unit 103 acquires, from the production condition DB 152, the product identification information inputted into the input unit 101 and the production condition for producing the product associated with the user identification information authenticated by the authentication unit 102. By employing such a configuration, a user is not authenticated by the authentication unit 102 unless the user knows the user identification information. Furthermore, a user cannot access the production condition for producing the product unless the user knows the combination of the product identification information and the user identification information. Therefore, employing such a configuration can reduce the risk of spillage or leakage of information about the product to the unauthorized third parties.

In the present embodiment, as shown in FIG. 5, the production condition acquired by the acquisition unit 103 is displayed on the user terminal 30. Then, by modifying the production condition displayed on the user terminal 30 by a user, the modification unit 104 generates the modified production condition in which the production condition acquired by the acquisition unit 103 is modified. This eliminates the need for the user to input a production condition each time the user makes a production request. In addition, for example, even in a case where the user has production know-how to change the dough fermentation time, etc. in accordance with the humidity and the air temperature on the production day, it is not necessary to modify the production condition registered in the production condition DB 152. Thus, this reduces the inconvenience of inputting a production condition and modifying the production condition DB 152 each time a production request is made. Furthermore, because the information registered in the production condition DB 152 does not include, for example, production know-how to change the dough fermentation time, etc. in accordance with the humidity and the air temperature on the production day, the risk of leakage of trade secrets can be reduced compared to the case where production know-how is included in the information registered in the production condition DB 152.

In the present embodiment, the material supply device 21 includes the lock mechanism 213, which reduces the risk of spillage or leakage of information about the material to the unauthorized third parties. Furthermore, the product storage device 23 includes the lock mechanism 233, which reduces the risk of spillage or leakage of information about the product to the unauthorized third parties.

In the present embodiment, the material supply device 21 supplies the material stored in the housing 211 from the material supply mechanism 215 to the processing device 22. However, the material supply device 21 may supply the material stored in the housing 211 to the processing device 22 through the opening 216. In this case, the supply instruction unit 105 of the production line control device 10 instructs the lock mechanism 213 of the material supply device 21 to execute unlocking, and then instructs the material supply mechanism 215 of the material supply device 21 to supply the material corresponding to the modified production condition. The opening/closing cover 212 should move to the open position, where it does not close the opening 216, after the lock mechanism 213 executes unlocking and before the material is supplied by the material supply mechanism 215. This configuration reduces the risk of spillage or leakage of information about the material from the material supply mechanism 215. The transfer of the material from the material supply device 21 to the processing device 22 can be realized by using well-known techniques such as pipelines, robots, conveyors, and unmanned transport vehicles, for example.

2. Embodiment 2

In Embodiment 1, a user modifies a production condition, but the modification unit 104 may present a modification plan for the production condition to the user. Specifically, the modification unit 104 proposes to the user a proposed modification for the production condition acquired by the acquisition unit 103 by using a learned model generated by machine learning based on combinations of environmental information and modified production conditions modified in accordance with the environmental information. The environmental information should be a factor that affects the quality of the product and that changes from day to day. In the present embodiment, the environmental information is described as including humidity and/or air temperature. The production line control device 10 can acquire the environmental information via a sensor such as a thermometer and/or hygrometer, which are not shown in the figure, or a network. In the following description, a proposed modification for the production condition proposed by the modification unit 104 to the user is referred to as "a proposed production condition". It is desirable that the proposed production condition is a condition for producing a product having a predetermined quality or higher under the environment indicated by the environmental information.

Figure 8:
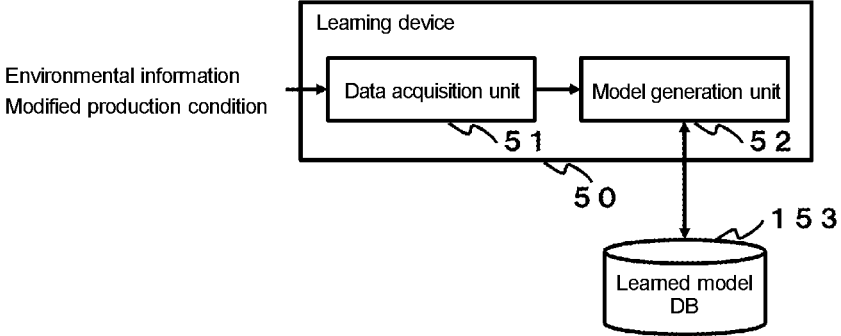
FIG. 8 is a functional block diagram of a learning device 50 related to the production line control device 10.

First, a mode of generating a learned model by machine learning will be described.
[Learning Phase]
First, a mode of generating a learned model by machine learning will be described. FIG. 8 is a functional block diagram of a learning device 50 related to the production line control device 10. The learning device 50 includes a data acquisition unit 51, a model generation unit 52, and a learned model storage unit 53.

The data acquisition unit 51 acquires environmental information and a modified production condition modified according to the environmental information as learning data.

The model generation unit 52 learns proposed production condition for producing a product having a predetermined quality or higher under the environment indicated by the environmental information on the basis of the learning data created on the basis of combinations of the environmental information and modified production conditions modified in accordance with the environmental information, which are outputted from the data acquisition unit 51. In other words, a learned model for inferring the proposed production condition for producing a product having a predetermined quality or higher under the environment indicated by the environmental information is generated from the environmental information of the production line control device 10 and the modified production conditions modified in accordance with the environmental information. Here, the learning data is data that relates the environmental information and the modified production conditions modified in accordance with the environmental information to each other.

The learning device 50, which is used to learn the proposed production conditions for producing a product having a predetermined quality or higher under the environment indicated by the environmental information, may be a separate device from the production line control device 10, connected to a production line control device 10 via a network, for example. The learning device 50 may be built in the production line control device 10.

The learning algorithm used by the model generation unit 52 can be a known algorithm such as supervised learning, unsupervised learning, reinforcement learning, etc. As an example, a case in which a neural network is applied will be described. The model generation unit 52 learns a proposed production condition for producing a product having a predetermined quality or higher under the environment indicated by the environmental information, for example, by so-called supervised learning in accordance with a neural network model. Here, the supervised learning is a method in which a data set of an input and a result (label) is given to a learning device, so that it learns features in the learning data and infers the result from the input.

Figure 9:
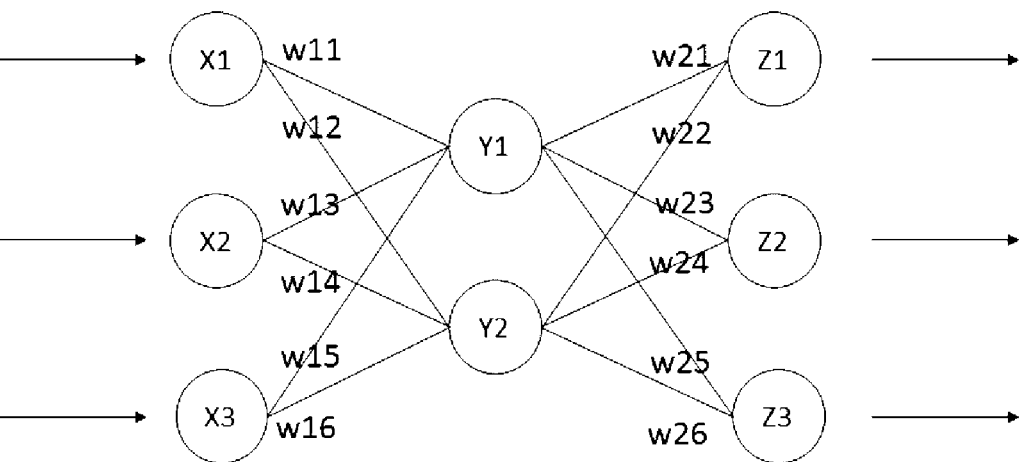
FIG. 9 is a diagram showing a three-layered neural network.

A neural network consists of an input layer consisting of multiple neurons, an intermediate layer (hidden layer) consisting of multiple neurons, and an output layer consisting of multiple neurons. The intermediate layer may be one layer or more than one layer. For example, in the three-layer neural network shown in FIG. 9, when multiple inputs are inputted to the input layer (X1 to X3), the values are multiplied by the weight W1 (w11 to w16) and inputted to the intermediate layer (Y1 to Y2), and the result is further multiplied by the weight W2 (w21 to w26) and outputted from the output layer (Z1 to Z3). The output result depends on the values of the weights W1 and W2.

In the present application, the neural network learns the proposed production condition for producing a product having a predetermined quality or higher under the environment indicated by the environmental information by so-called supervised learning in accordance with the learning data created on the basis of the combinations of the environmental information and the modified production conditions modified in accordance with the environmental information, which are acquired by the data acquisition unit 51.

That is, the neural network learns in a way in which the weights W1 and W2 are adjusted so that the result outputted from the output layer by inputting environmental information into the input layer should approach a modified manufacturing condition modified according to the environmental information.

The model generation unit 52 generates and outputs the learned model by performing the above-described learning.

A learned model DB 153 stores the learned model outputted from the model generation unit 52.

Figure 10:
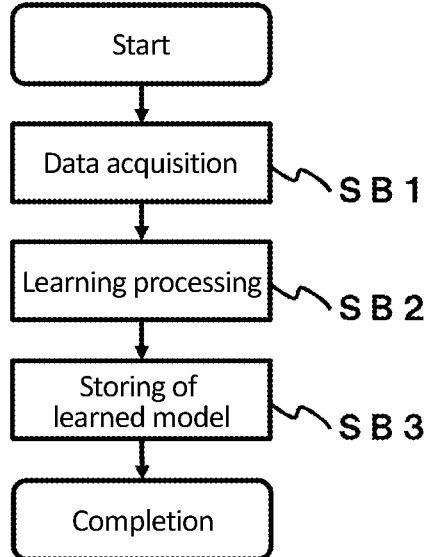
FIG. 10 is a flowchart related to a learning process of the learning device 50.

Next, a learning process of the learning device 50 will be described with reference to FIG. 10. FIG. 10 is a flowchart related to the learning process of the learning device 50.

In step SB1, the data acquisition unit 51 acquires the environmental information and the modified production condition modified in accordance with the environmental information. Although the environmental information and the modified production condition modified in accordance with the environmental information are assumed to be acquired at the same time, it is sufficient if the environmental information and the modified production condition modified in accordance with the environmental information can be inputted in relation to each other, and data for the environmental information and the modified production condition modified in accordance with the environmental information may be acquired at different times.

In step SB2, the model generation unit 52 learns the proposed production condition for producing a product having a predetermined quality or higher under the environment indicated by the environmental information by so-called supervised learning in accordance with the learning data created on the basis of combinations of the environmental information and modified production conditions modified in accordance with the environmental information, which are acquired by the data acquisition unit 51, and generates the learned model.

In step SB3, the learned model DB 153 stores the learned model generated by the model generation unit 52.

[Utilization Phase]

Figure 11:
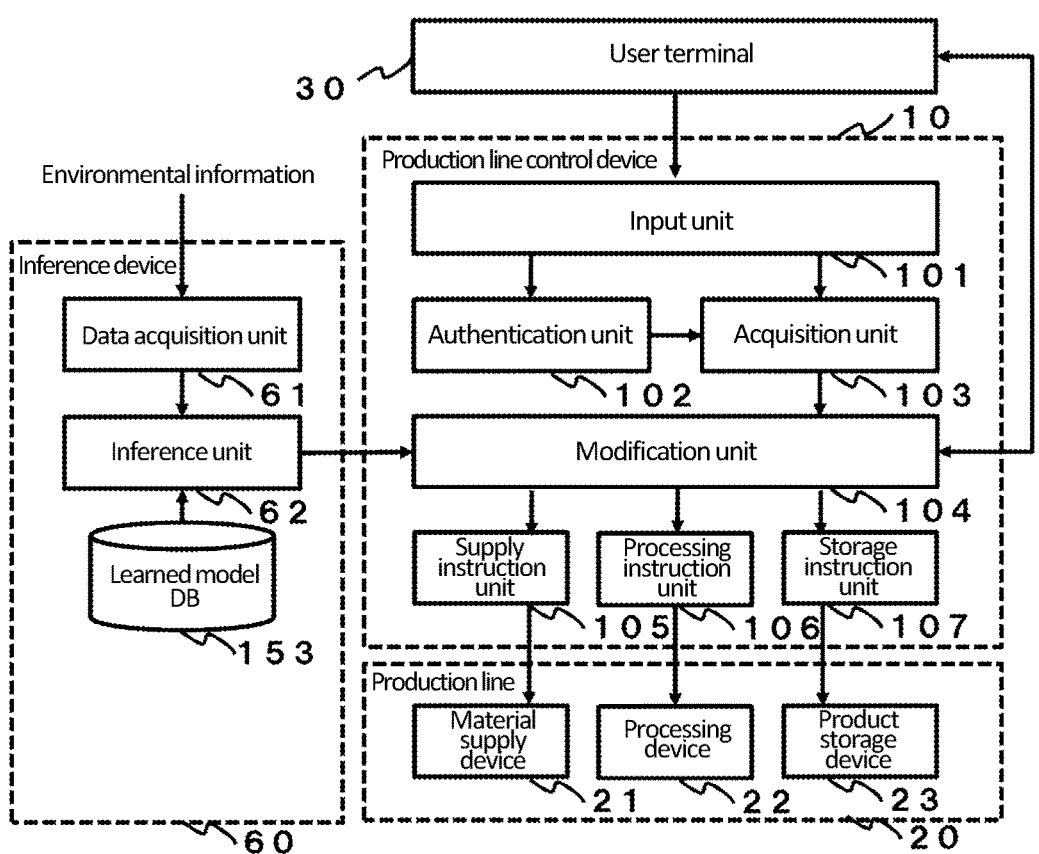
FIG. 11 is a functional block diagram of an inference device 60 related to the production line control device 10.

FIG. 11 is a configuration diagram of an inference device 60 related to the production line control device 10. The inference device 60 includes a data acquisition unit 61 and an inference unit 62.

The data acquisition unit 61 acquires the environmental information.

The inference unit 62 infers a proposed production condition for producing a product having a predetermined quality or higher under the environment indicated by the environmental information using the learned model. In other words, by inputting the environmental information acquired in the data acquisition unit 61 into the learned model, the proposed production condition, which is inferred from environmental information, for producing a product having a predetermined quality or higher under the environment indicated by the environmental information can be outputted.

In this embodiment, it is explained that the proposed production condition for producing a product having a predetermined quality or higher under the environment indicated by the environmental information is output by using the learned model learned by the model generation unit 52 of the production line control device 10; however, it is also possible to acquire a learned model from outside of another production line control device 10 and output the proposed production condition for producing a product having a predetermined quality or higher under the environment indicated by the environmental information on the basis of the learned model.

Figure 12:
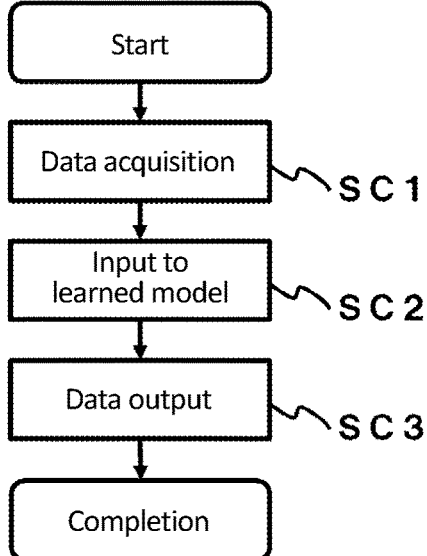
FIG. 12 is a flowchart related to inference processing of the inference device 60.

Next, a process for obtaining, using the inference device 60, the proposed production condition for producing a product having a predetermined quality or higher under the environment indicated by the environmental information will be described. FIG. 12 is a flowchart related to inference processing of the inference device 60.

In step SC1, the data acquisition unit 61 acquires environmental information.

In step SC2, the inference unit 62 inputs the environmental information to the learned model stored in learned model DB 153 to obtain a proposed production condition for producing a product having a predetermined quality or higher under the environment indicated by the environmental information.

In step SC2, the inference unit 62 outputs the proposed production condition for producing a product having a predetermined quality or higher under the environment indicated by the environmental information, which are obtained by the learned model, to the production line control device 10.

In step SC3, the production line control device 10 transmits the outputted a proposed production condition for producing a product having a predetermined quality or higher under the environment indicated by the environmental information and the production condition acquired by the acquisition unit 103 to the user terminal 30. The user modifies the production condition by referring to the proposed production condition. In this way, using the learned model generated by the machine learning based on the combinations of the environmental information and modified production conditions modified in accordance with the environmental information, the modification unit 104 modifies the production condition acquired by the acquisition unit 103 to generate a modified production condition.

The present embodiment describes a case in which supervised learning is applied to the learning algorithm used by the model generation unit, but this is not the limitation. For learning algorithms, reinforcement learning, unsupervised learning, semi-supervised learning, etc., can be applied other than supervised learning.

The learning algorithm used in the model generation unit 52 may use deep learning, which learns to extract the features themselves, or may perform machine learning by using other known methods, such as genetic programming, functional logic programming, support vector machines, etc.

In Embodiment 2 above, modification of a production condition acquired by the acquisition unit is proposed by using the learned model generated by the machine learning based on the combinations of the environmental information and modified production conditions modified in accordance with the environmental information. However, not limited to this, modification of a production condition acquired by the acquisition unit 103 may be proposed by using the learned model generated by the machine learning based on the combinations of the environmental information, modified production conditions modified in accordance with the environmental information, and material attribute information indicating material attributes. The material attribute information may include the place of production (or producer), harvest (or production) date, and variety (or brand, quality, feedstock) of the material. The material attribute information should be at least a factor that affects the quality of the product.

Also, modification of a production condition acquired by the acquisition unit 103 may be proposed by using the learned model generated by the machine learning based on the combinations of the environmental information, modified production conditions modified in accordance with the environmental information, and device attribute information indicating the attribute of the device constituting the production line 20. The device attribute information may include the manufacturer of the device, the model of the device, and the performance of the device. The device attribute information should be at least a factor that affects the quality of the product.

As described above, by using the machine-learned learned model to propose modification to a production condition acquired by the acquisition unit 103, it is possible, for example, to reduce the inconvenience of considering modification to the production condition. Furthermore, by proposing modification to the production condition acquired by the acquisition unit 103 using a learned model that has been machine-learned including the quality of products produced in the past, it is possible to suppress, for example, a decrease in the quality of products to be produced.

3. Embodiment 3

In Embodiment 1, the production line control device 10 accepts, from the user terminal 30 connected via the network 40, production request information, which requests the production of a product. In addition, the production request information includes user identification information to identify the user requesting the production of the product, and product identification information to identify the product to be produced in the production line 20; however, this is not a limitation. The production request information may include a production deadline indicating a deadline for producing the product.

Figure 13:
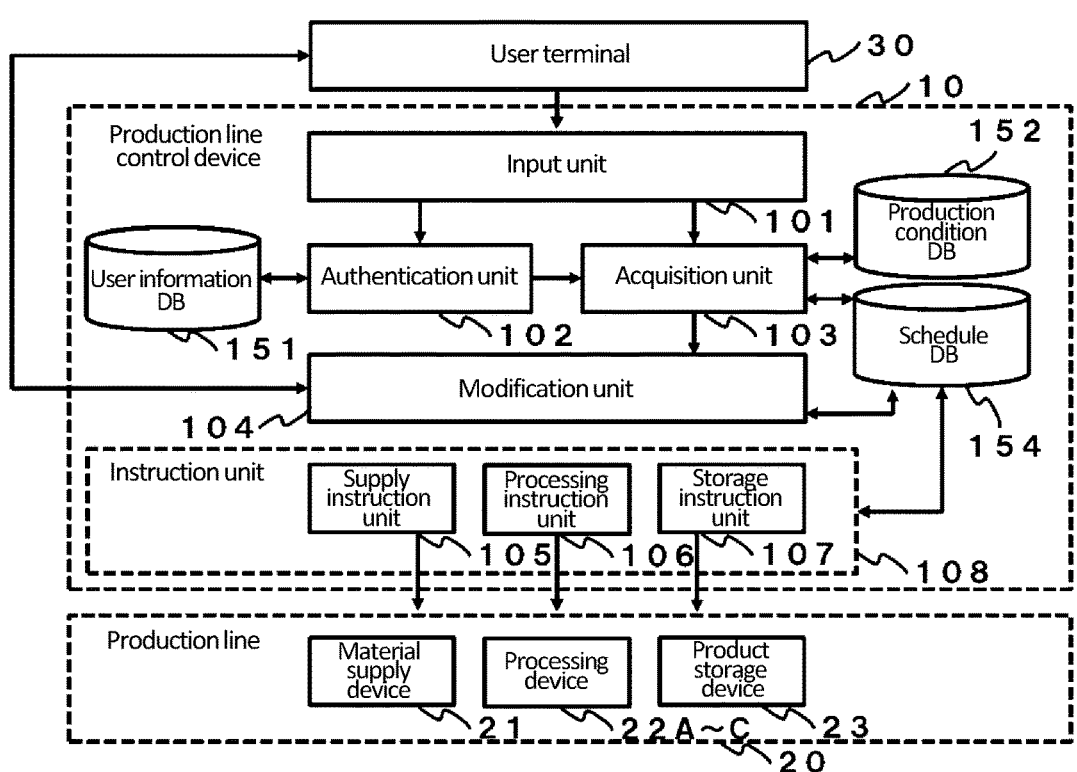
FIG. 13 is a functional block diagram of a production line control device 10 according to Embodiment 3.
Figure 14:
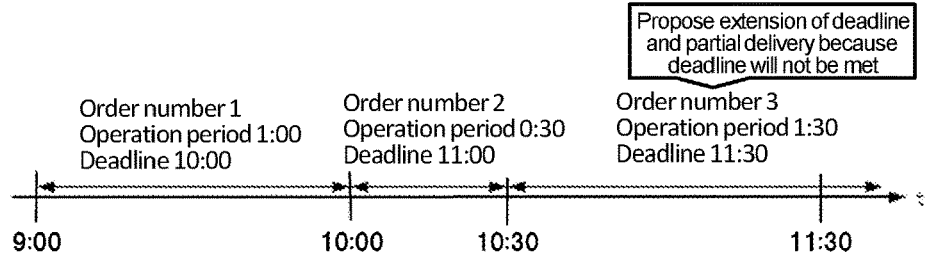
FIG. 14 is a diagram showing a production schedule.

FIG. 13 is a functional block diagram of a production line control device 10 according to Embodiment 3. Differences from Embodiment 1 will be described. First, a production schedule including a production request date and time for producing a product in the production line 20 and a modified production condition is registered in a schedule DB 154. Then, a user operates the user terminal 30 to input user identification information of the user, product identification information indicating a product to be produced in the production line 20, and a production request date and time for producing the product. The input unit 101 of the production line control device 10 accepts the input of the production request information transmitted from the user terminal 30. The acquisition unit 103 of the production line control device 10 acquires from the production condition DB 152 the production condition for producing the product associated with the product identification information inputted into the input unit 101 and the user identification information authenticated by the authentication unit 102. The acquisition unit 103 of the production line control device 10 also acquires the production schedule corresponding to the production request date and time from the schedule DB 154. Here, when the production schedule can be acquired from the schedule DB 154, that is, if the production schedule is available, the modification unit 104 registers the production schedule with the production request date and time as the production date and time in the schedule DB. Then, an instruction unit 108 acquires, from the schedule DB, a modified production condition in which the current date and time coincide with the production request date and time, and transmits the acquired modified production condition to each device. On the other hand, when the production schedule cannot be acquired from the schedule DB 154, that is, if no production schedule is available, the modification unit 104 transmits a request to modify the production request date and time to the user terminal 30.

The production request information may include a production deadline date and time indicating the deadline for producing the product. In this case, the modification unit 104 registers in the schedule DB 154 a production schedule in which the production starts in order from the production request information whose production deadline date and time is closer to the current date and time. As shown in FIG.

14, if a production request arises in which production cannot be completed by the production deadline date and time, the modification unit 104 notifies the number of products that will be produced by the production deadline date and time. The modification unit 104 may also notify the scheduled date and time when the production of all products according to the production request information will be completed. In this case, the modification unit 104 may also propose partial delivery of the products whose production is to be completed by the production deadline date and time and the products whose production is to be completed after the production deadline, and/or extension of the production deadline date and time.

Figure 15:
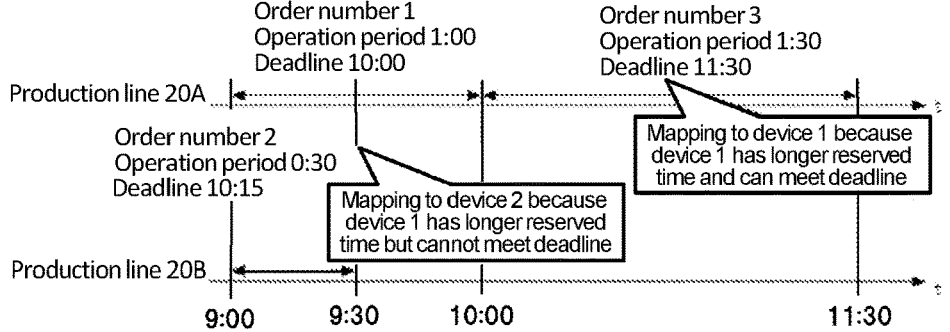
FIG. 15 is a diagram showing production schedules of a plurality of production lines.

When there are a plurality of production lines 20, the modification unit 104 may register the production schedule according to the production request information, starting with a production line 20 in order whose production schedule is full, that is, whose reserved time is longer. For example, as shown in FIG. 15, in a case where a production schedule according to order number 1 (1 hour operation period) is registered in a device 1 and a production schedule according to order number 2 (0.5 hour operation period) is registered in a device 2, the production schedule according to order number 3 is registered in a device 1. Thus, as shown in FIG. 15, the device 2 with a shorter reserved time can accept a production request with a long operation period.

DESCRIPTION OF REFERENCE NUMERALS

- 1 production line control system
- 10 production line control device
- 12 main memory
- 15 storage unit
- 20 production line
- 21 material supply device
- 22 processing device
- 23 product storage device
- 30 user terminal
- 40 network
- 50 learning device
- 51 data acquisition unit
- 52 model generation unit
- 53 learned model storage unit
- 60 inference device
- 61 data acquisition unit
- 62 inference unit
- 101 input unit
- 102 authentication unit
- 103 acquisition unit
- 104 modification unit
- 105 supply instruction unit
- 106 processing instruction unit
- 107 storage instruction unit
- 108 instruction unit
- 211 housing
- 212 opening/closing cover
- 213 lock mechanism
- 214 operation unit
- 215 material supply mechanism
- 216 opening
- 231 housing
- 232 opening/closing cover
- 233 lock mechanism
- 234 operation unit
- 235 opening
- 236 opening

The invention claimed is:

1. A production line control device to control a production line shared by a plurality of users and having a material supply device that supplies a stored material, a processing device that processes the material supplied from the material supply device, and a product storage device that stores a product processed by the processing device, the production line control device comprising:

an input unit comprising a communication interface to receive user identification information of the plurality of users and product identification information indicating a product to be produced in the production line from each of a plurality of user terminals connected via a network;

a processor to execute a program; and a memory to store the program which, when executed by the processor, performs processes of, authenticating the user identification information received by the input unit, acquiring production conditions for each of the material supply device the processing device and the product storage device, for producing a product associated with the product identification information received by the input unit and the authenticated user identification information, generating modified production conditions by modifying the acquired production conditions for each of the material supply device, the processing device and the product storage device, instructing the material supply device to supply a material corresponding to the modified production condition for the material supply device, instructing the processing device to process a material corresponding to the modified production condition for the processing device, and instructing the product storage device to store a product corresponding to the generated modified production condition for the product storage device, wherein the authentication of the received user identification information, by the processor, permits a sequential performance of the instructing the material supply device to supply the material, the instructing the processing device to process the material, and the instructing the product storage device to store the product.

2. The production line control device according to claim 1, wherein the material supply device has a lock mechanism to execute locking against putting in and taking out of the material, and the production line control device instructs, using the authenticated user identification information, the material supply device corresponding to the modified production condition to execute unlocking and then to supply the material.

3. The production line control device according to claim 2, wherein the product storage device has a lock mechanism to execute locking against putting in and taking out of the product, and the production line control device instructs, using the authenticated user identification information, the product storage device storing the product processed by the processing device to execute locking.

4. The production line control device according to claim 3, wherein the production line control device presents a proposed modification for the acquired production condition by using a learned model generated by machine learning based on a combination of environmental information affecting quality of the product and the modified production condition modified in accordance with the environmental information.

5. The production line control device according to claim 2, wherein the production line control device presents a proposed modification for the acquired production condition by using a learned model generated by machine learning based on a combination of environmental information affecting quality of the product and the modified production condition modified in accordance with the environmental information.

6. The production line control device according to claim 1, wherein the product storage device has a lock mechanism to execute locking against putting in and taking out of the product, and the production line control device instructs, using the authenticated user identification information, the product storage device storing the product processed by the processing device to execute locking.

7. The production line control device according to claim 6, wherein the production line control device presents a proposed modification for the acquired production condition by using a learned model generated by machine learning based on a combination of environmental information affecting quality of the product and the modified production condition modified in accordance with the environmental information.

8. The production line control device according to claim 1, wherein the production line control device presents a proposed modification for the acquired production condition by using a learned model generated by machine learning based on a combination of environmental information affecting quality of the product and the modified production condition modified in accordance with the environmental information.

9. A production line control system comprising:

a production line shared by a plurality of users and having a material supply device that supplies a stored material, a processing device that processes the material supplied from the material supply device, and a product storage device that stores a product processed by the processing device; and a control device including:

an input unit comprising a communication interface to receive user identification information of the plurality of users and product identification information indicating a product to be produced in the production line from each of a plurality of user terminals connected via a network;

a processor to execute a program; and a memory to store the program which, when executed by the processor, performs processes of, authenticating the user identification information received by the input unit, acquiring production conditions for each of the material supply device, the processing device and the product storage device, for producing a product associated with the product identification information received by the input unit and the authenticated user identification information, generating modified production conditions by modifying the acquired production conditions for each of the material supply device, the processing device and the product storage device, instructing the material supply device to supply a material corresponding to the modified production condition for the material supply device, instructing the processing device to process a material corresponding to the modified production condition for the processing device, and instructing the product storage device to store a product corresponding to the generated modified production condition for the product storage device, wherein the authentication of the received user identification information, by the processor, permits a sequential performance of the instructing the material supply device to supply the material, the instructing the processing device to process the material, and the instructing the product storage device to store the product.

10. A production line control method of controlling a production line shared by a plurality of users and having a material supply device that supplies a stored material, a processing device that processes the material supplied from the material supply device, and a product storage device that stores a product processed by the processing device, the production line control method comprising:

an input step of receiving user identification information of the plurality of users and product identification information indicating a product to be produced in the production line from each of a plurality of user terminals connected via a network;

an authentication step of authenticating the user identification information received in the input step;

an acquisition step of acquiring production conditions for each of the material supply device, the processing device and the product storage device, for producing a product associated with the product identification information received in the input step and the user identification information authenticated in the authentication step;

a modification step of generating-a modified production conditions by modifying the production conditions acquired in the acquisition step for each of the material supply device, the processing device and the product storage device;

a supply instruction step of instructing the material supply device to supply a material corresponding to the modified production condition for the material supply device;

a processing instruction step of instructing the processing device to process a material corresponding to the modified production condition for the processing device; and a storage instruction step of instructing the product storage device to store a product corresponding to the generated modified production condition for the product storage device, wherein the authentication of the received user identification information permits sequentially performing the instructing the material supply device to supply the material, the instructing the processing device to process the material, and the instructing the product storage device to store the product.

* * * * *